(12) United States Patent
Lin et al.

(10) Patent No.: US 7,508,373 B2
(45) Date of Patent: Mar. 24, 2009

(54) FORM FACTOR AND INPUT METHOD FOR LANGUAGE INPUT

(75) Inventors: Zhouchen Lin, Beijing (CN); Rongrong Wang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 11/045,399

(22) Filed: Jan. 28, 2005

(65) Prior Publication Data

US 2006/0170657 A1 Aug. 3, 2006

(51) Int. Cl.
*G09G 5/00* (2006.01)
(52) U.S. Cl. .................. 345/156; 345/164; 345/171; 345/184
(58) Field of Classification Search .............. 345/156, 345/171, 164, 184
See application file for complete search history.

(56) References Cited

U.S. PATENT DOCUMENTS 6,062,749 A * 5/2000 Oikawa et al. .............. 400/110

FOREIGN PATENT DOCUMENTS

JP 2000-267794 * 9/2000

* cited by examiner

*Primary Examiner*—Richard Hjerpe
*Assistant Examiner*—Leonid Shapiro
(74) *Attorney, Agent, or Firm*—Perkins Coie LLP (57) ABSTRACT

An input method and apparatus is provided for use in various computer and mobile devices. The input device utilizes a rotating dial in which four arrows printed on the dial are rotated to select characters that are fixed along the circumference of a circle. The characters are divided into various zones. The zones are utilized to encode various letters and numbers. Additionally the zones may be utilized for editing and control functions. The dial may be freely rotated. Pressing any arrow inputs the character that the arrow points to on the dial. The input device and method may encode Asian language characters according to a set of encoding rules.

12 Claims, 7 Drawing Sheets

| a  | ai  | an  | ang  | ao   |      |      |      |     |
|----|-----|-----|------|------|------|------|------|-----|
| e  | ei  | en  | eng  |      |      |      |      |     |
| i  | ia  | ian | iang | iao  | ie   | in   | ing  | iu  |
| o  | ong | ou  |      |      |      |      | iong |     |
| u  | ua  | uai | uan  | uang | ue   | ui   | un   | uo  |
| ü  | üe  |     |      |      |      |      |      |     |

- 601 — Dian:
- 602 — Heng:
- 603 — Shu:
- 604 — Pie:
- 605 — Na:
- 606 — Ti:
- 607 — Gou:
- 608 — Zhe: the rest basic strokes.

| English | Chinese Character | Chinese Pronunciation | Encoding |
|---|---|---|---|
| bear | 熊 | xióng | xjozd |
| one | 一 | yī | yih |
| two | 二 | èr | □hrhh |
| grasp | 捉 | zhuō | zuohn |
| sugar | 糖 | táng | tbmdh |
| dog | 狗 | gǒu | gquph |
| rabbit | 兔 | tù | txpd |
| peace | 安 | ān | □andh |

Figure 8

FORM FACTOR AND INPUT METHOD FOR LANGUAGE INPUT

BACKGROUND OF THE INVENTION

1. Field of the Invention

The invention relates to a character input device for computer-or-mobile-device-related systems for use with various languages. The invention concerns, more particularly, a character input device for use on devices in which no complete QWERTY keyboard is available. The invention has application to various peripheral input devices for computers and communication devices.

2. Description of Background Art

Input devices for handheld computers and mobile devices commonly include a wide variety of user interaction mechanisms such as thumbsticks, D-pads, and various depressible buttons. However, in order to input text and other characters, a keyboard is preferably utilized. These keyboards are limited in size by the size of the handheld computer or mobile device. Attempts have been made to integrate keys corresponding to alphanumeric keys onto these various devices. However, such attempts have been less than satisfactory, as the size, number, and/or configuration of the keys and/or the methods of using the keys have not provided a solution that permits for efficient entry of a large number of letters and other characters without drawbacks.

A further limitation upon input devices having keys corresponding to characters relates to the various locations, languages, and cultures for which the input devices are manufactured. Depending upon the location in which the input device is utilized, the language of the user, and the culture of the user, the various characters that are input by activating the keys may be substantially different. For example, it is difficult to enter Asian characters in mobile devices that usually have only small keyboards. Inputting into such small keyboards is difficult and time consuming.

Figure 1:
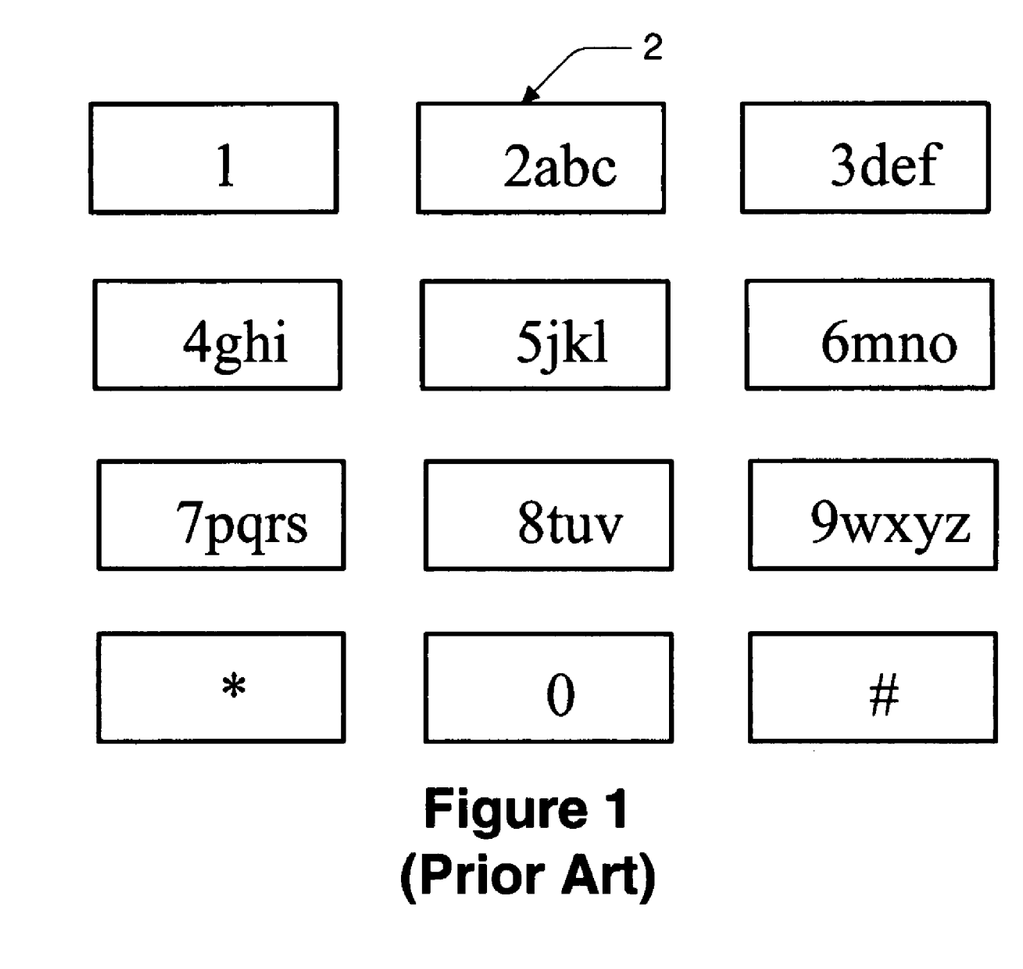
FIG. 1 illustrates a diagram of a prior art input keyboard.

Currently, there are mainly two solutions to this problem, both of which have drawbacks. The first solution is the T9 input method (http://www.t9.com), which is suitable for word-level input. It provides only those options that are meaningful words whose characters are on the keys pressed. A user selects from the options presented to the user. The second solution involves pressing a key button multiple times quickly to indicate which character to input, see FIG. 1, e.g., pressing the number "two" key (2) once means inputting "2." Pressing the number "two" key (2) three times means inputting the character "b." This method is suitable for inputting single characters but it requires the user to pause the depressing of keys for some period of time to ensure that the user is not choosing the next character printed on the same key.

The utilization of either of the above solutions is inefficient and time consuming. Thus, there is a need for an efficient input method and apparatus that allows input of various languages which is easy to use and can be applied to various user devices.

SUMMARY OF THE INVENTION

The invention provides a character input device for use in various computer and mobile devices. The input device utilizes a rotating dial in which four arrows printed on the dial are rotated to select characters that are fixed along the circumference of a circle. The characters are divided into various zones. The zones are utilized to encode various letters and numbers. Additionally the zones may be utilized for editing and control functions. The dial may be freely rotated. Pressing any arrow inputs the character that the arrow points to on the dial. The input device and method may encode Asian language characters according to a set of encoding rules.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

Exemplary Operating Environment

Figure 2:
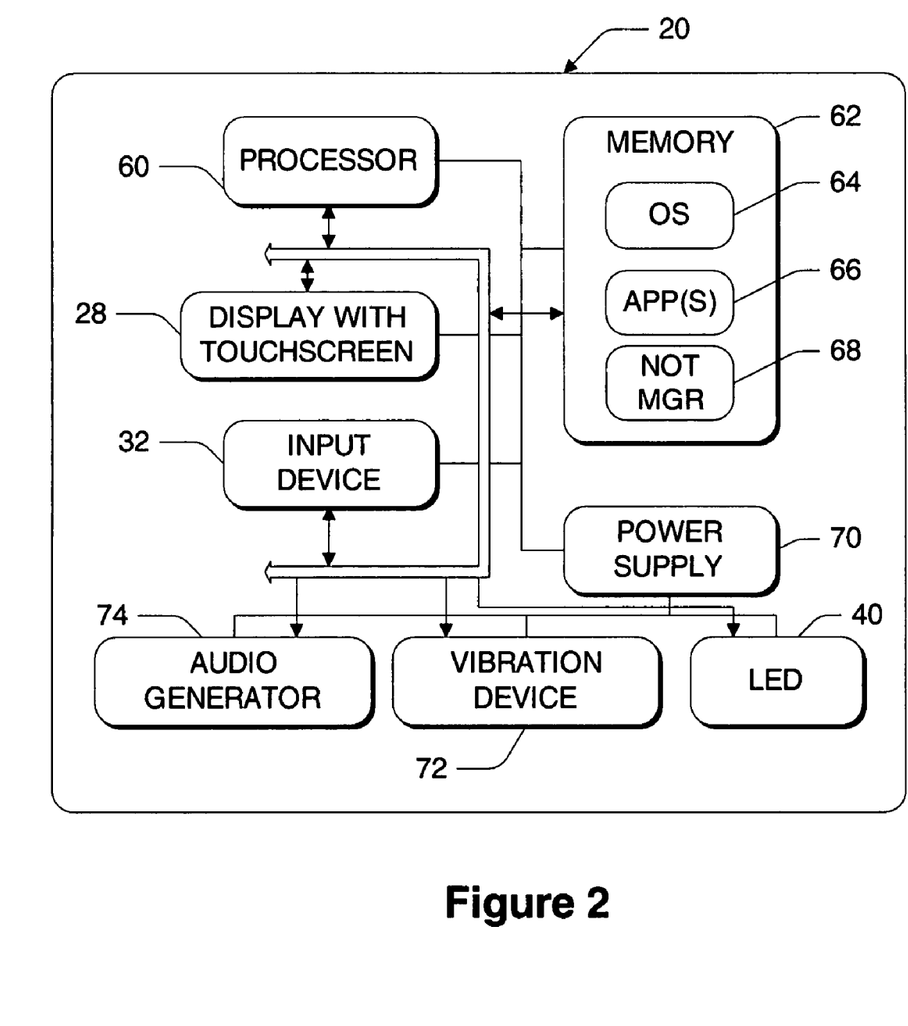
FIG. 2 illustrates a diagram of a handheld computing device that may be used in accordance with an aspect of the invention.

FIG. 2 shows functional components of a computing device 20. Computing device 20 may take the form of a personal or laptop computer. The computing device 20 may also take the form of a handheld computing device such as a personal digital assistant (PDA), cellular telephone, mobile terminal, personal video recorder, portable television, personal computer, digital camera, digital camcorder, portable audio device, portable radio, or combinations thereof.

Computing device 20 may comprise a processor 60, a memory 62, a display 28, and an input device 32. The memory 62 generally includes both volatile memory (e.g., RAM) and non-volatile memory (e.g., ROM, PCMCIA cards, etc.). An operating system 64 is resident in the memory 62 and executes on the processor 60. The computing device 20 may comprise an operating system, such as the Windows® CE operating system from Microsoft Corporation or other operating system.

One or more application programs 66 are loaded into memory 62 and run on the operating system 64. Examples of applications include email programs, scheduling programs, PIM (personal information management) programs, word processing programs, spreadsheet programs, Internet browser programs, and so forth. The computing device 20 may also have a notification manager 68 loaded in memory 62, which executes on the processor 60. The notification manager 68 handles notification requests from the applications 66.

The computing device 20 may have a power supply 70, which is implemented as one or more batteries. The power supply 70 might further include an external power source that overrides or recharges the built-in batteries, such as an AC adapter or a powered docking cradle.

The computing device 20 may also comprise external notification mechanisms such as an LED 40, a vibration device 72, and an audio generator 74. These devices are directly coupled to the power supply 70 so that when activated, they remain on for a duration dictated by the notification mechanism even though the processor and other components might shut down to conserve battery power. The LED 40 preferably remains on indefinitely until the user takes action.

Computing device 20 may also contain communications connection(s) (not shown) that allow the computing device to communicate with other devices. Communications connection(s) may include wired media such as a wired network or direct-wired connection, and wireless media such as acoustic, RF, infrared and other wireless media.

Figure 3:
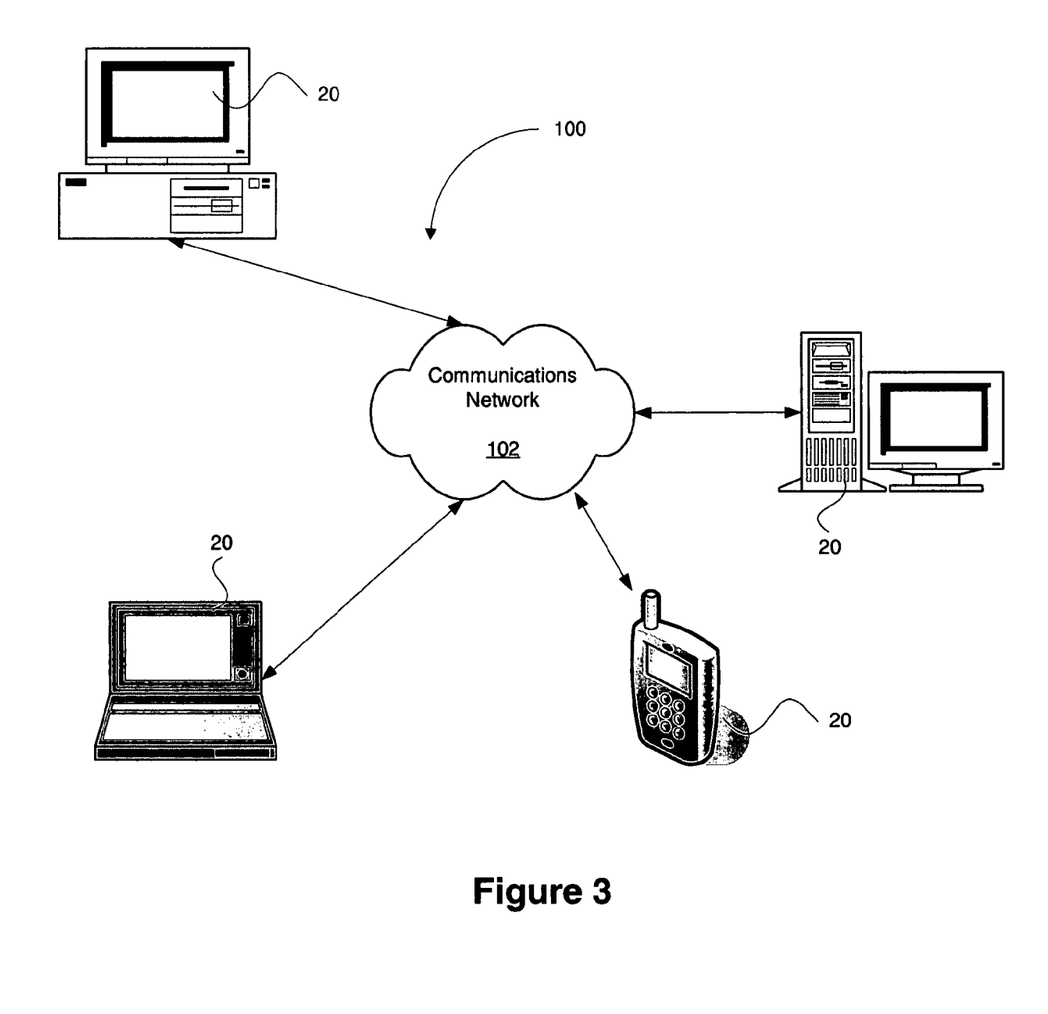
FIG. 3 illustrates a diagram of computing devices connected to a network that may be used in accordance with an aspect of the invention.

FIG. 3 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services. Systems may also include more than one communication network, such as a LAN coupled to the Internet.

Various computer devices 20 may be coupled to communications network 102. Network interfaces or adapters may be used to connect computer devices 20 to a LAN. When communications network 102 includes a WAN, modems or other means for establishing communications over WANs may be utilized. Computer devices 20 may communicate with one another via communication network 102 in ways that are well known in the art. The existence of any of various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like, is presumed.

Embodiments within the scope of the present invention also include computer readable media having executable instructions. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Description of Illustrative Aspects of the Invention

The input method and apparatus of the invention and, more specifically, the operation of the input device and method are disclosed with reference to the Chinese language in the below detailed description. The invention, however, has application to numerous other Asian and non-Asian languages where language input is utilized, in devices including personal computer systems and hand-held electronic devices, such as personal data assistants and mobile telephones. Accordingly, one skilled in the relevant art will recognize that the present invention may be applied to a variety of products using various different languages other than the exemplary Chinese language which is disclosed herein.

Figure 4:
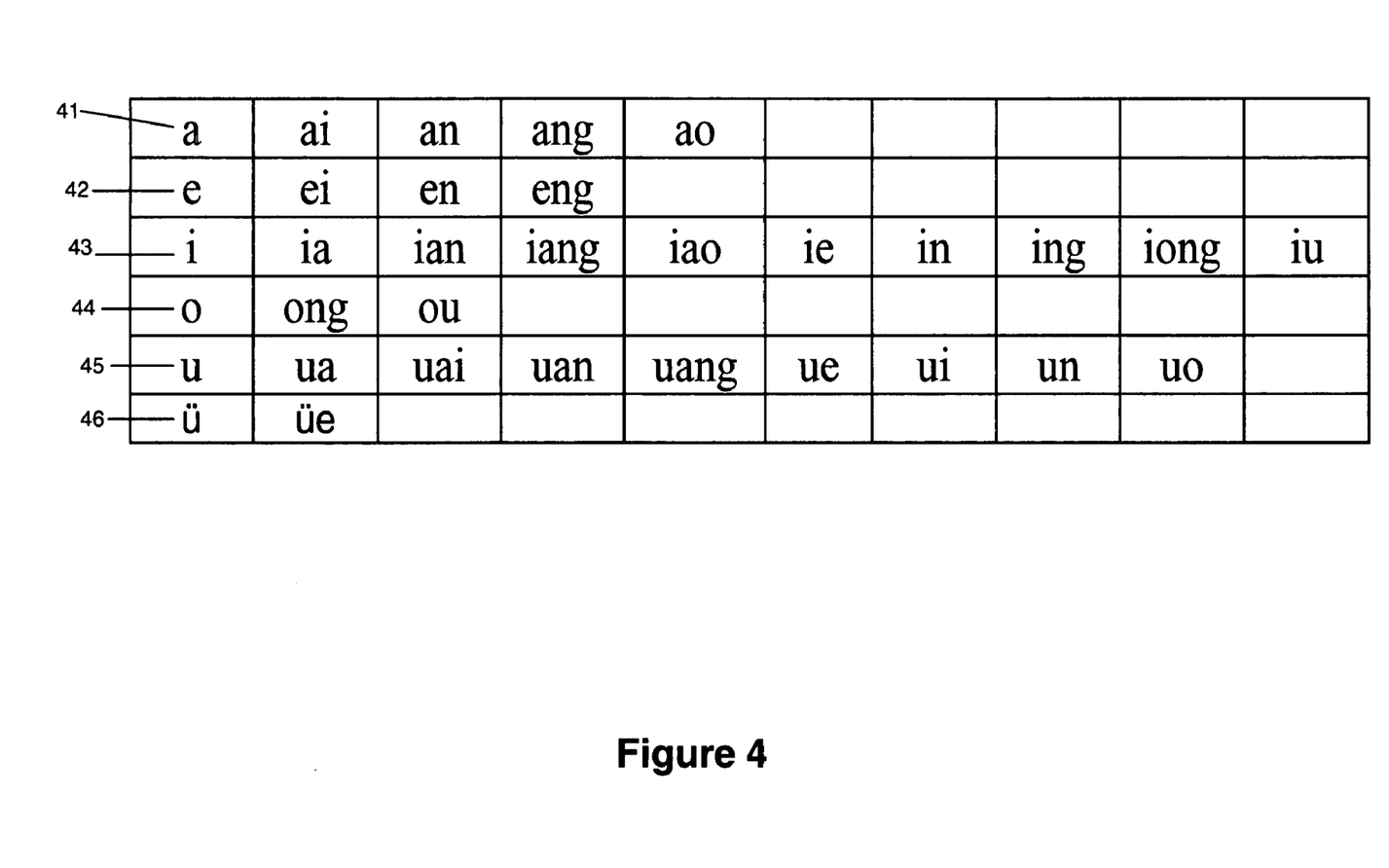
FIG. 4 illustrates a table of all Yunmu in Chinese Pinyin used in accordance with an aspect of the invention.

Chinese Pinyin is the Romanized system to represent Chinese sounds. It uses the same alphabet as the English language with the additional letter 'ü'. Pinyin consists of Shengmu and Yunmu and utilizes four tone markers. Shengmu includes: b, c, ch, d, f, g, h, j, k, l, m, n, p, q, r, s, sh, t, w, x, y, z, and zh. FIG. 4 includes all of the Yunmu in Chinese Pinyin. For example, there are five possibilities for the first letter of Yunmu as shown in FIG. 4. These first letters include a (41), e (42), i (43), o (44), u (45), and ü (46).

The four tones in Chinese Pinyin are represented by the characters: -, /, v, \, which are written above part of the Yunmu, e.g., ā, á, ǎ, à. An example of Chinese Pinyin is 'zhāng', where 'zh' is the Shengmu, 'ang' is the Yunmu, and the bar above 'a' indicates that it is of the first tone. Not all combinations of Shengmu, Yunmu and tone are valid Pinyin, e.g., no Chinese word will have a Pinyin like 'kiā'.

Figure 5:
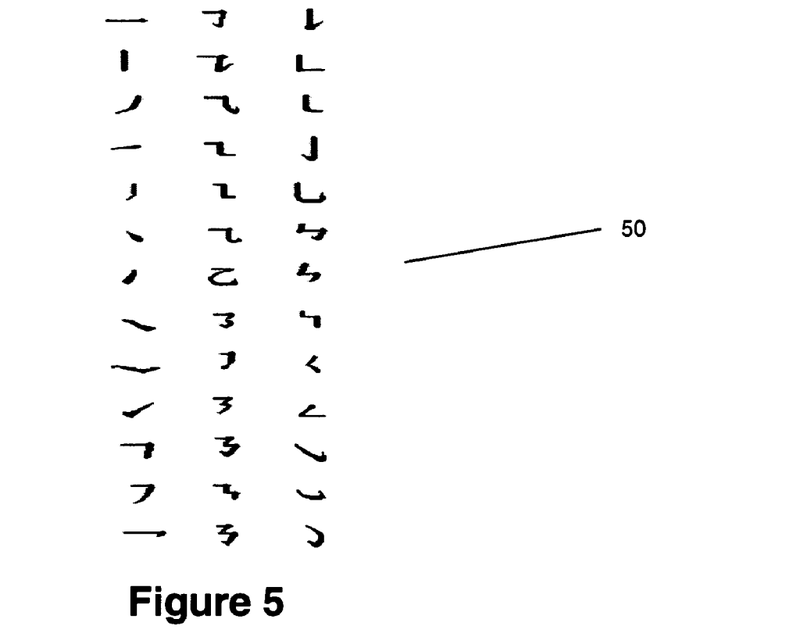
FIG. 5 illustrates the basic Chinese strokes which are used to compose Chinese characters in accordance with an aspect of the invention.

In addition to Chinese Pinyin, the Chinese language comprises Chinese strokes. Each character in the Chinese language is composed of various basic strokes. FIG. 5 illustrates basic Chinese strokes (50) which are used to compose Chinese characters in accordance with an aspect of the invention.

Figure 7:
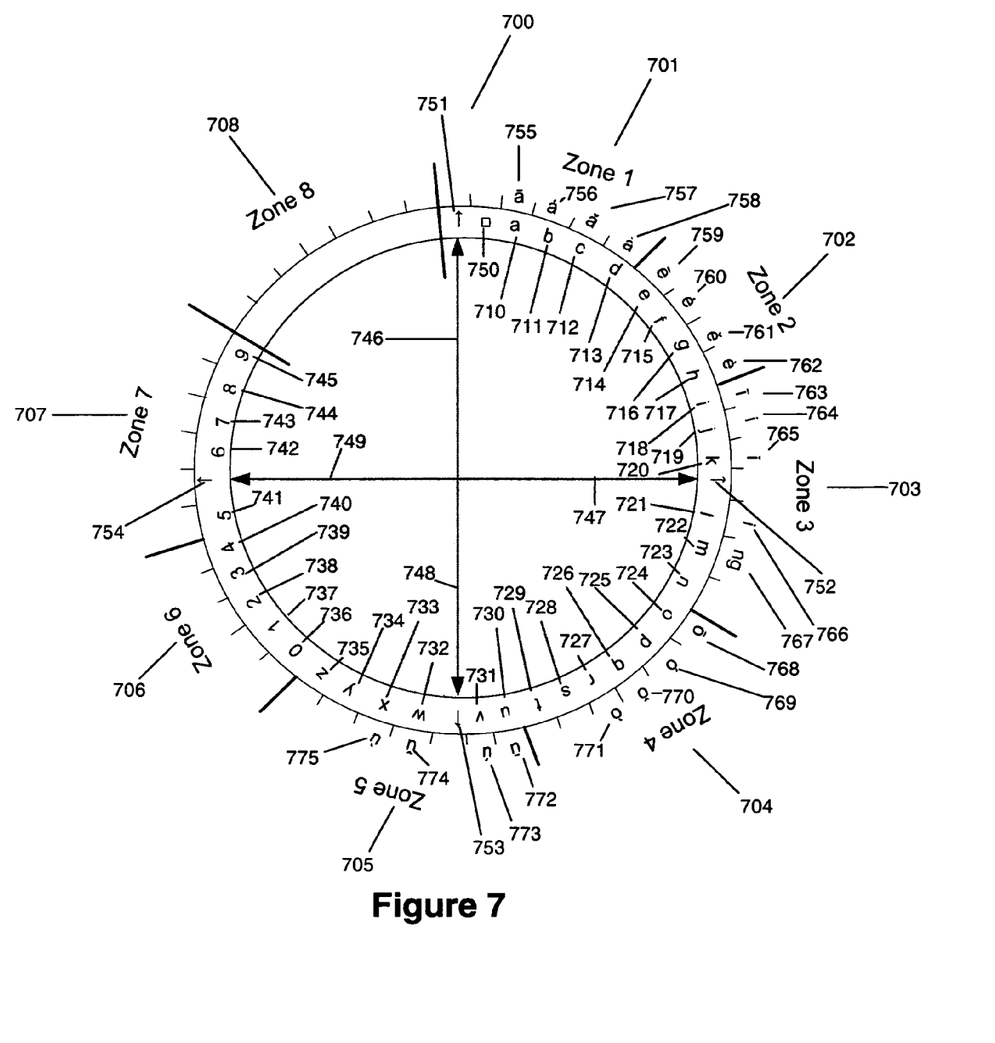
FIG. 7 illustrates a user interface apparatus in accordance with an aspect of the invention.

In an aspect of the invention, a user interface may comprise a turntable or wheel 700 such as illustrated in FIG. 7. The turntable 700 may comprise eight different regions or zones. Zones 1 through 5 (701-705) represent English language letters. For example, zone 1 (701) may comprise English language letters a (710), b (711), c (712), and d (713). Zone 2 (702) may comprise English language letters e (714), f (715), g (716), and h (717). Similarly, zone 3 (703) may comprise English language letters i (718), j (719), k (720), l (721), m (722), and n (723). Moreover, zone 4 (704) may comprise English language letters o (724), p (725), q (726), r (727), s (728), and t (729). Finally, zone 5 (705) may comprise English language letters u (730), v (731), w (732), x (733), y (734), and z (735). As illustrated by FIG. 7 and the above description, all of the English language letters are divided into 5 zones according to the vowels 'a', 'e', 'i', 'o', and 'u'. Note these vowels are critical for Chinese Yunmu as shown in FIG. 4 and they are also major vowels of most languages. Additional characters that may be contained in zones 1 through 5 include the 'space ☐' key (750), and the arrows keys '↑' (751), '→' (752), '↓' (753), and '←' (754). The arrows keys '↑' (751) '→' (752), '↓' (753) and '←' (754) may provide up/right/down/left operations, which are very frequent and natural in the entry of any language text characters.

Zone 6 (706) and Zone 7 (707) of the invention, may comprise number characters for use with an aspect of the invention. For example, zone 6 may comprise numbers 0 (736), 1 (737), 2 (738), 3 (739), and 4 (740). In addition, zone 7 (707) may comprise numbers 5 (741), 6 (742), 7 (743), 8

(744), and 9 (745). The digits may be split into two zones so that searching the digits on the turntable (700) can be faster, because identifying an object in a smaller group may be easier.

In an aspect of the invention, zone 8 (708) may be used for editing and control. The turntable 700 may also comprise four arrows (746-749) fixed on the central circle that can be rotated freely as shown in FIG. 7. Pressing any arrow may input the character that the particular arrow points to on the central dial. In this way, the characters on the turntable may be entered into the device. The turntable solves the problem of inadequate space for alphanumerical characters if keys are utilized for character input. For example, in one embodiment the printed size of each character may be 2 mm×2 mm, which may be an actual size used on existing mobile phones. With 48 characters on the turntable, the diameter of the turntable will be 48*2/π+2*2≈35 mm. This amount of space is an affordable size on an ordinary mobile device.

Printed on the outside of the turntable are the four tones of vowels and 'ng' which are part of the Chinese four tones. For example, the four tones for the Yunmu language character "a" are ā (755), á (756), ǎ (757), and à (758). For each of the other Yunmu language characters, the four tones are also labeled outside of the turntable. For the language character "e" the four tones include ē (759), é (760), ě (761), and è (762). Similarly for the language character "i" the four tones include ī (763), í (764), ǐ (765), and ì (766). Also included in zone 3 (703) is language character "ng" (767). For the language character "o" the four tones include ō (768), ó (769), ǒ (770), and ò (771). Finally for language character "u" the four tones include ū (772), ú (773), ǔ (774), and ù (775).

In an aspect of the invention, both Pinyin and Stroke are used to encode a Chinese character. The encoding of Chinese characters may be in the form of $$C_1C_2C_3C_4C_5$$

where:
$C_1$ is the code for Shengmu,
$C_2$ is the code for the first letter of Yunmu+tone,
$C_3$ is the code for the remaining letters of Yunmu,
$C_4$ is the code for first stroke, and
$C_5$ is the code for last stroke.

$C_3$ and $C_5$ may be null, but $C_1$, $C_2$ and $C_4$ may not be null. $C_2$ and $C_4$ may not be null because there is at least one vowel and one stroke for a Chinese character. $C_5$ may only be null when the Chinese character only has one stroke. There are only two such characters: 一 and 乙. $C1$ may be null only when the character does not have a Shengmu, however, in order to preserve the sequence of the encoding and not cause ambiguity in the encoding scheme, a space may be inputted. The space (750) may be found in Zone 1 (701). When a code ($C_3$ or $C_5$) is null, it does not need to be inputted.

As discussed above, Shengmu includes: b, c, ch, d, f, g, h, j, k, l, m, n, p, q, r, s, sh, t, w, x, y, z, and zh. In an aspect of the invention, the letter 'c' may be used to represent both 'c' and 'ch', the letter 's' may be used to represent both 's' and 'sh', and the letter use 'z' may be used to represent both 'z' and 'zh.' With these representations all Shengmu may be encoded with one English letter. Therefore, $C_1$ may include the characters: 'space', 'b', 'c', 'd', 'f', 'g', 'h', 'j', 'k', 'l', 'm', 'n', 'p', 'q', 'r', 's', 't', 'w', 'x', 'y', and 'z'.

As illustrated above in FIG. 4, there are five possibilities for the first letter of Yunmu: a, e, i, o, u, and ü. In an aspect of the invention, the letter 'u' may be used to represent both 'u' and 'ü'. With this representation, $C_2$ which represents the first letter of Yunmu may be encoded with only one English letter. Moreover, the number of slots from the corresponding first letter of Yunmu may be used to represent the tone. For example, suppose the first letter of Yunmu is 'a'. If the Pinyin is of the first, second, third and fourth tone, respectively, then $C_2$ may be 'a', 'b', 'c', and 'd', respectively. In order to remind a user of the tones of each vowel, the tones may be directly labeled outside the turntable as shown in FIG. 7.

There are twelve possibilities for the remaining letters of Yunmu which may be represented by $C_3$. The remaining letters may include:
a, ai, an, ang, ao,
e,
i,
o, ong,
u,
n,
ng According to another aspect of the invention, the character 'a' may be used to represent 'a', 'ai', 'an', 'ang', and 'ao.' The character 'o' may be used to represent both 'o' and 'ong.' The character 'm' may be used to represent 'ng.' With the above ending rules for $C_3$, the possible character for $C_3$ may include: null, 'a', 'e', 'i', 'o', 'u', 'n', and 'm.'

Figure 6:
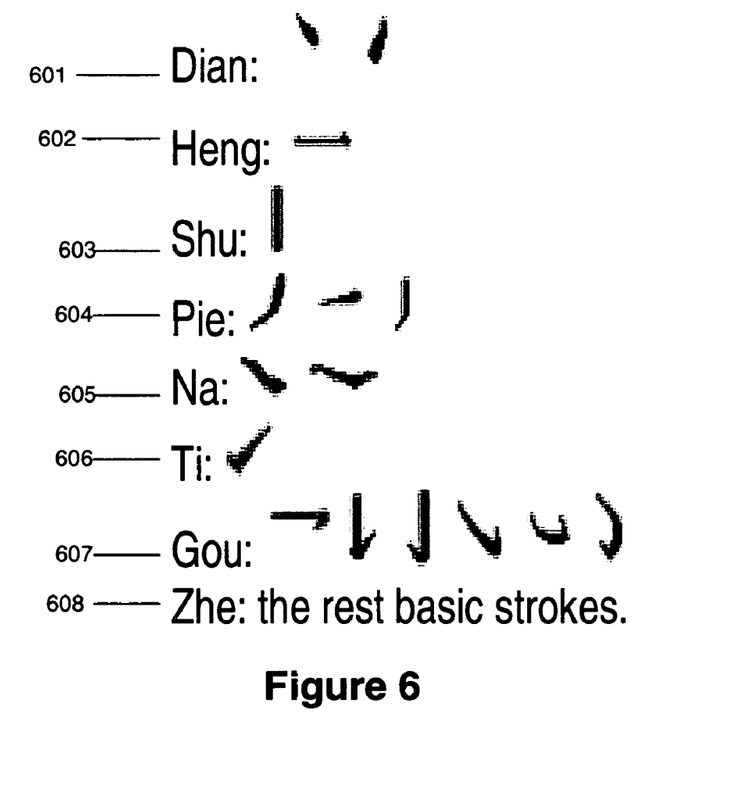
FIG. 6 illustrates a grouping of the Chinese strokes shown in FIG. 5 into eight groups in accordance with an aspect of the invention.

In order to encode the Stroke of a Chinese character, the basic strokes 50 as illustrated in FIG. 5 may be grouped or categorized into eight classes as shown in FIG. 6. The classes may include: Dian (601), Heng (602), Shu (603), Pie (604), Na (605), Ti (606), Gou (607), and Zhe (608). Each of the groups may contain similar characteristics as illustrated below:

Dian: ˋ ノ
Heng: ━
Shu: ｜
Pie: ノ ー ノ
Na: ﹨ ﹋
Ti: ✓
Gou: ⌐ ｜ 亅 ﹨ ﹍ ）
Zhe: remaining basic strokes.

For example, the strokes grouped to Gou (607) may all have a characteristic such as except for a sharp hook at the end of the character they do not have another large turning angle. As another example, the strokes grouped to Zhe (608) may all share a characteristic such as they have only one right angle in the middle of the character or have more than one large turning angle.

The eight classes of strokes may be encoded by their first letters: d, h, s, p, n, t, g, and z, respectively. These first letters may be used as the values of $C_4$ and $C_5$. In addition, $C_5$ may also contain a null value.

According to the above encoding rules, except for the character 'n', $C_4$ is always different from $C_3$. However, when the third code of a Chinese character is 'n', it may be determined whether $C_3$=n, or $C_3$=null and $C_4$=n by checking the total length of the code, because according to the above encoding rules, if the code length is five, then $C_3$=n. Otherwise, $C_3$=null and $C_4$=n.

In another aspect of the invention, if there are several Chinese characters that share the same encoding, the user may choose among various candidates which can arise when a Pinyin is shared by too many Chinese characters. Such kinds of Pinyin are few in number and even for these Pinyins, for each encoding C, the number N of characters whose encodings are all C is relatively small. For example, N<7, which allows for fast searching among these candidates. The above result was obtained by surveying a library of Chinese characters with a population more than 15,000. The number of commonly used Chinese characters may be less than 5000, and simplified Chinese characters used in mainland China account about only ⅔ rds of the library. Therefore, by limiting the Chinese characters to be inputted to commonly used characters, or ordering the Chinese characters according to their usage frequency, or using context of words and phrases, the probability of the first candidate being the desired Chinese character is very high. These strategies may greatly reduce the time of searching among candidates, enabling fast input of Chinese characters using the encoding method and apparatus described above.

Figure 8:
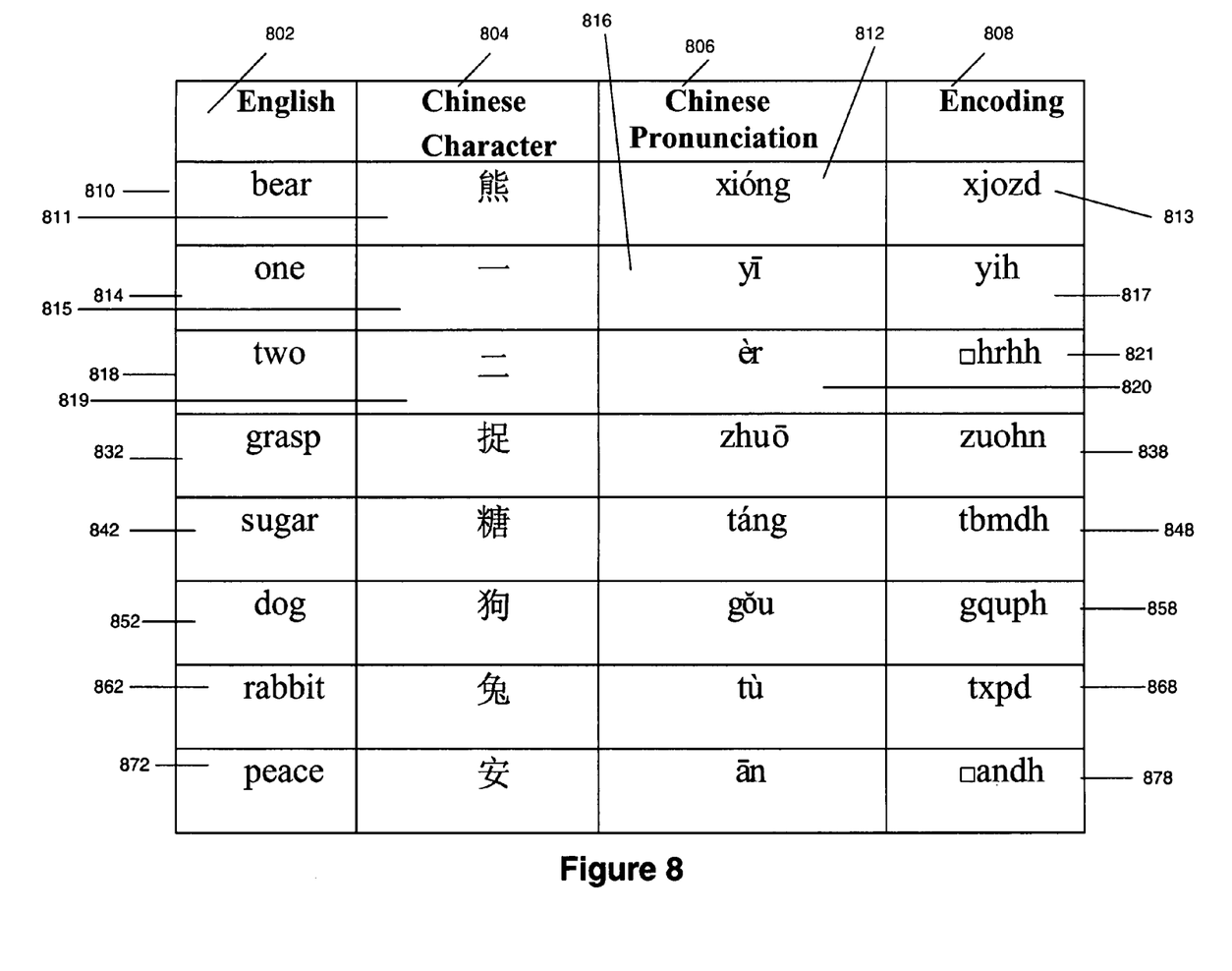
FIG. 8 illustrates examples of the encoding scheme using the user interface in accordance with an aspect of the invention.

Using the above described encoding scheme some illustrative examples are provided in FIG. 8. In FIG. 8, a table is presented which shows words in English (802) along with the corresponding Chinese character (804) and the Chinese pronunciation (806) in Pinyin. Also included is the encoding (808) scheme for the English word (802) in accordance with an aspect of the invention. For example, a user may wish to enter the Chinese equivalent of the English word "bear" (810). The Chinese Character 熊(811) represents the English word "bear" (810). The Chinese Pronunciation of the word "bear" is xióng (812) and the encoding of the word "bear" (810) according to an aspect of the invention is "xjozd" (813). The encoding as described above may in the form of:

$C_1C_2C_3C_4C_5$ where:
$C_1$ is the code for Shengmu,
$C_2$ is the code for the first letter of Yunmu+tone,
$C_3$ is the code for the remaining letters of Yunmu,
$C_4$ is the code for first stroke, and
$C_5$ is the code for last stroke.

Referring to the Chinese pronunciation xióng (812), 'x' is the first letter of Shengmu. "iong" is the Yunmu of the Chinese pronunciation. The first letter of the Yunmu is "i" and is of the second tone. The remaining letters of the Yunmu is "ong" and is represented by its first letter "o". 'z' is the first letter of the Chinese pronunciation for the first stroke of the Chinese character, which is "zhe". Finally, "d" is the first letter of the Chinese pronunciation for the last stroke of the Chinese character, which is "dian". Therefore, the encoding according to an aspect of the invention is "xjozd" which is the combination of:

$C_1$ is x,
$C_2$ is j,
$C_3$ is o,
$C_4$ is z,
$C_5$ is d.

In order to enter the encoding, a user rotates the turntable of FIG. 7 so that the arrow (748) that is nearest to the "x" (733) points to the "x" (733). Once the arrow (748) points to "x" (733) the user enters the character by depressing the arrow. Next, the user rotates an arrow to character "i" (764) which is in the identical position of "j" (719) and enters the character by depressing the arrow. The user then positions one of the arrows to the character "o" (724) and depresses the arrow to enter the character. Next, the user positions an arrow over the "z" character (735) and depresses the arrow to input the character. Finally, the user positions the arrow over the "d" character (713) and depresses the arrow in order to enter the character.

Another example of the encoding scheme and user interface is illustrated for the word "one". For instance, a user may wish to enter the Chinese equivalent of the English word "one" (814). The Chinese Character 一(815) represents the English word "one" (814). The Chinese Pronunciation of the word "one" is yī (816) and the encoding of the word "one" (814) according to an aspect of the invention is "yih" (817).

Referring to the Chinese pronunciation yī (816), y is the first letter of Shengmu. "i" is first letter of the Yunmu of the Chinese pronunciation and is of the first tone. There are no other remaining letters of the Yunmu. "h" is the first letter of the Chinese pronunciation for the first stroke of the Chinese character, which is "heng". Therefore, the encoding according to an aspect of the invention is "yih" (817) which is combination of:

$C_1$ is y,
$C_2$ is i,
$C_3$ is null (as the length of the Yunmu is less than three),
$C_4$ is h,
$C_5$ is null (as the number of strokes is less than two).

In order to enter the encoding, a user rotates the turntable of FIG. 7 so that the arrow (748) that is nearest to the "y" (734) points to the "y" (734). Once the arrow (748) points to "y" (734) the user enters the character by depressing the arrow. Next, the user rotates an arrow to character "i" (763) which is in the identical position of "i" (718) and enters the character by depressing the arrow. The user then positions one of the arrows to the character "h" (717) and depresses the arrow to enter the character.

As a third example of the encoding scheme and user interface the word "two" is encoded. For instance, a user may wish to enter the Chinese equivalent of the English word "two" (818). The Chinese Character 二(819) represents the English word "two" (818). The Chinese Pronunciation of the word "two" is èr (820) and the encoding of the word "two" (818) according to an aspect of the invention is "□hrhh" (821).

Referring to the Chinese pronunciation èr (820), the first letter of Shengmu is a space "□". "h" is fourth letter after the first letter of Yunmu which is "e" as the Chinese pronunciation is of the fourth tone. The remaining letters of the Yunmu is "r". "h" is the first letter of the Chinese pronunciation for the first stroke of the Chinese character, which is "heng". Finally, "h" is the first letter of the Chinese pronunciation for the last stroke of the Chinese character, which is "heng". Therefore, the encoding according to an aspect of the invention is "□hrhh" (821) which is the combination of:

$C_1$ is □,
$C_2$ is h,
$C_3$ is r,
$C_4$ is h,
$C_5$ is h.

In order to enter the encoding, a user rotates the turntable of FIG. 7 so that the arrow (746) that is nearest to the "□" (750) points to the "□" (750). Once the arrow (746) points to "□" (750) the user enters the character by depressing the arrow. Next, the user rotates an arrow to character "h" (717) which is in the identical position of "è" (762) and enters the character by depressing the arrow. The user then positions one of the arrows to the character "h" (717) and depresses the arrow twice to enter the character "h" two times.

FIG. 7 also provides the encoding for other words such as "grasp" (832), "sugar" (842), "dog" (852), "rabbit" (862), and "peace" (872). Their respective encoding according to an aspect of the invention may be "zuohn" (838), "tbmdh" (848), "gquph" (858), "txpd" (868), "□andh" (878), respectively.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

We claim:

1. A method of inputting language characters into a computing device, the method comprising steps of:
   encoding Chinese language characters based on a set of encoding rules, wherein a Chinese language character is encoded as $C_1C_2C_3C_4C_5$ where:
   $C_1$ is a code for a Shengmu of a Pinyin of the Chinese language character,
   $C_2$ is a code for a first letter of Yunmu plus tone of a Pinyin of the Chinese language character,
   $C_3$ is a code for remaining letters of Yunmu of a Pinyin of the Chinese language character,
   $C_4$ is a code for a first stroke of the Chinese language character, and
   $C_5$ is a c code for a last stroke of the Chinese language character; and
   inputting the encoded language characters into the computing device using a turntable selection device with a central circular portion that is rotatable and outer portion representing Pinyin characters and strokes, such that a user inputs a Chinese language character by rotating the central circular portion to point to characters and strokes on the outer portion to input $C_1C_2C_3C_4C_5$ corresponding to the encoding for the Chinese language character.

2. The method recited in claim 1, wherein the turntable selection device comprises character identifiers.

3. The method recited in claim 1, wherein the turntable selection device comprises at least eight zones.

4. The method recited in claim 1, wherein the inputted encoded language characters are stored in memory of the computing device.

5. The method recited in claim 1, wherein the computing device comprises a cellular telephone.

6. An input apparatus for inputting Chinese characters into a computing device, the input apparatus comprising:
   a turntable user interface to enter the Chinese characters; and
   a plurality of character identifiers associated with positions located on a turntable user interface such that a user can input a Chinese character by indicating to rotate the turntable to a sequence of character identifiers that identify the Chinese character that is encoded as $C_1C_2C_3C_4C_5$ where:
   $C_1$ is a code for a Shengmu of a Pinyin of the Chinese character,
   $C_2$ is a code for a first letter of Yunmu plus tone of a Pinyin of the Chinese character,
   $C_3$ is a code for remaining letters of Yunmu of a Pinyin of the Chinese character,
   $C_4$ is a code for a first stroke of the Chinese character, and
   $C_5$ is a code for a last stroke of the Chinese character.

7. The input apparatus recited in claim 6, wherein the turntable user interface comprises at least eight zones.

8. The input apparatus recited in claim 6, wherein the computing device comprises a cellular telephone.

9. In a computer system having a graphical user interface including a display and a user interface selection device, a method of inputting Chinese language characters encoded using Chinese Pinyin and Stroke, the method comprising:
   encoding language characters based on a set of encoding rules wherein a Chinese language character is encoded as $C_1C_2C_3C_4C_5$ where:
   $C_1$ is a code for a Shengmu of a Pinyin of the Chinese language character,
   $C_2$ is a code for a first letter of Yunmu plus tone of a Pinyin of the Chinese language character,
   $C_3$ is a code for remaining letters of Yunmu of a Pinyin of the Chinese language character,
   $C_4$ is a code for a first stroke of the Chinese language character, and
   $C_5$ is a c code for a last stroke of the Chinese language character; and
   receiving encoded language characters into the computer system using a turntable apparatus.

10. The method recited in claim 9, wherein the turntable apparatus comprises at least eight zones.

11. The method recited in claim 9, wherein the inputted encoded language characters are stored in memory of the computer system.

12. The method recited in claim 9, wherein the computer system comprises a tablet personal computer.

* * * * *

UNITED STATES PATENT AND TRADEMARK OFFICE
CERTIFICATE OF CORRECTION

PATENT NO. : 7,508,373 B2  
APPLICATION NO. : 11/045399  
DATED : March 24, 2009  
INVENTOR(S) : Zhouchen Lin et al.

It is certified that error appears in the above-identified patent and that said Letters Patent is hereby corrected as shown below:

In column 9, line 14, in Claim 1, delete "ofYunmu" and insert -- of Yunmu --, therefor.

In column 10, line 8, in Claim 6, delete "ofYunmu" and insert -- of Yunmu --, therefor.

In column 10, line 28, in Claim 9, delete "ofYunmu" and insert -- of Yunmu --, therefor.

Signed and Sealed this  
Third Day of May, 2011

David J. Kappos  
*Director of the United States Patent and Trademark Office*